3,502,705
N-CARBOXYACYL-N'-HYDRO-
CARBYLTHIO UREAS
Melancthon S. Brown, Berkeley, Calif., assignor to Chevron Research Company, San Francisco, Calif., a corporation of Delaware
No Drawing. Filed June 26, 1967, Ser. No. 648,977
Int. Cl. C07c 1/16, 1/22
U.S. Cl. 260—453           7 Claims

ABSTRACT OF THE DISCLOSURE

N-carboxyacyl-N'-hydrocarbylthio ureas in which the carboxyacyl group contains 1 to about 20 carbon atoms and the hydrocarbyl group is an aliphatic group of 1 to about 8 carbon atoms substituted with 1 to about 6 halogens and 0 to 1 nitro groups or monocyclic aryl which is substituted with 0 to 5 halogen atoms. These compounds may be prepared by reacting a sulfenyl halide with an alkali metal salt of a carboxyacyl cyanamide and hydrolyzing the resulting carbodiimide. Ureas of this class are fungicidal.

FIELD OF INVENTION

This invention concerns N-carboxyacyl-N'-hydrocarbylthio ureas.

DESCRIPTION OF THE INVENTION

The ureas of this invention are N-carboxyacyl-N'-hydrocarbylthio ureas in which the carboxyacyl group contains 1 to about 20 carbon atoms and the hydrocarbyl group is aliphatic group of 1 to about 8 carbon atoms substituted with 1 to about 6 halogens of atomic number 17 to 35, i.e. Cl and Br, and 0 to 1 nitro groups of monocyclic aryl of 6 to about 8 carbon atoms which is substituted with 0 to 5 halogens of atomic number 17 to 35. As used herein the term "carboxyacyl" refers to an acyl group derived from a carboxylic acid. The carboxyacyl group may be formyl, alkanoyl, alkenoyl, cycloalkanoyl, aroyl, etc. They may be substituted by groups such as nitro, cyano, chloro, alkoxy and the like.

Typical hydrocarbyl groups which may be present in these ureas include phenyl, tolyl, xylyl; halophenyl such as p-chlorophenyl, p-bromophenyl 2,4-dichlorophenyl and pentachlorophenyl; 1-halo-1-nitroalkyl such as 1-chloro-1-nitroethyl and 1-chloro-1-nitropropyl; polyhalovinyl such as 2,2-dichlorovinyl, 1,2-dibromovinyl and trichlorovinyl; and polyhaloalkyl such as trichloromethyl, pentachloroethyl, 1,2,2-trichloroethyl, 1,1,2,2-tetrachloroethyl, tribromomethyl, 1,2-dibromo-2,2-dichloroethyl, 1,2,2,4-tetrachlorobutyl and the like.

Preferred compounds of this invention may be represented by the general formula

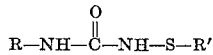

in which R represents an aroyl or alkanoyl group of 2 to about 15 carbon atoms and R' represents a polychloroalkyl group having 1 to 2 carbon atoms and 3 to 5 chlorine atoms, at least 1 of which is bound to the α carbon atom of the alkyl group, a polychlorovinyl group containing 2 to 3 chlorine atoms or a chlorophenyl group. Particularly preferred compounds are those in which R is alkanoyl of 2 to 4 carbon atoms, benzoyl, chlorobenzoyl or nitrobenzoyl and R' is perchloromethyl or 1,1,2,2-tetrachloroethyl.

Exemplary compounds of this invention are N-acetyl-N'-1,1,2-trichloroethylthio urea, N-butyryl-N'-perbromomethylthio urea, N-hexanoyl-N'-p-chlorophenylthio urea, N-octanoyl-N'-2,4-dichlorophenylthio urea, N-lauroyl-N'-tolylthio urea, N-benzoyl-N'-phenylthio urea, N-cyclohexanoyl-N'-perchloroethylthio urea, N-p-bromocyclohexanoyl-N'-trichlorovinylthio urea, N-acryloyl-N'-2,2-dibromovinylthio urea, N-benzoyl-N'-1,2-dibromo-2,2-dichloropropylthio urea, N-p-chlorobenzoyl-N'-2,2,2-trichloroethylthio urea, N-p-cyanobenzoyl-N'-p-bromophenylthio urea, N-toluoyl-N'-trichlorovinylthio urea, N-naphthoyl-N'-1,2,3,4-tetrachlorobutylthio urea, N-p-methoxybenzoyl-N'-perchloroethylthio urea, N-p-bromobenzoyl-N-p-bromophenylthio urea, N-benzoyl-N'-1-chloro-1-nitroethylthio urea, N-acetyl-N'-1-chloro-1-nitropropylthio urea and N-cyclohexanoyl-N'-1-chloro-1-nitroamylthio urea.

The ureas of this invention may be made by hydrolizing an N-carboxyacyl-N'-hydrocarbylthio carbodiimide. This hydrolysis may be achieved by contacting the carbodiimide with water at temperatures in the range of about 0 to 100° C. The hydrolysis may be carried out in the presence of an inert solvent for the carbodiimide such as acetonitrile, chloroform, dioxane, benzene and dimethylformamide.

A convenient method for making these ureas is to perform the hydrolysis integrally with preparing the carbodiimide. Thus the carbodiimide may be prepared by reacting a hydrocarbylsulfenyl halide in which the hydrocarbyl group is as previously described, preferably a hydrocarbylsulfenyl chloride, with an alkali metal salt of a carboxyacyl cyanamide, preferably the Na salt. This reaction may be carried out in an aqueous medium at temperatures in the range of about 0 to 50° C. These conditions, in and of themselves, may be sufficient to hydrolize the carbodiimide to the urea depending upon the nature of the hydrocarbyl group (R' in the above formula) and the hydrolysis conditions. If the carbodiimide is not susceptible to hydrolysis under these reaction conditions more rigorous hydrolysis conditions may be necessary.

Aqueous media which may be used in preparing the carbodiimide precursor include water and mixtures of water with relatively inert water miscible organic solvents such as dioxane, dimethoxyethane and dimethylformamide. The alkali metal salt of the carboxyacyl cyanamide may be prepared in situ by adding a carboxyacyl cyanamide to an alkali metal hydroxide. Alternatively, the salt may be prepared in a like manner prior to the reaction and then added separately.

Ureas of this invention may also be prepared by reacting N-carboxyacyl ureas with sulfenyl halides in inert solvents such as dimethylformamide. Alternatively, they may be prepared by reacting a carboxyacyl cyanamide with water and a sulfenyl halide.

The ureas of this invention are crystalline solids. Thus they may be isolated from the reaction mixture by conventional methods such as filtration. They may be purified by washing with organic solvents and by recrystallization from organic solvents such as chloroform, acetone, benzene, and acetonitrile.

EXAMPLES

The following examples are offered to illustrate the unique ureas of this invention. These examples are offered as illustrative and are in no way meant to limit the indicated, percentages are by weight.

Example 1

9.0 g. of 50% sodium hydroxide and 250 ml. of ice water were mixed in a blender. 14 g. of benzoyl cyanamide were added to this mixture and blended for about 1 minute. 22.5 g. of 1,2,2,2-tetrachloroethylsulfenyl chloride were added to the blender and the combined mixture was blended for about ten mintues. A solid precipitate formed. This precipitate was filtered and washed with ice water and returned to the blender where it was blended with cold hexane, filtered and washed again with hexane. The remaining solid was dissolved in 300 ml. chloroform and the solution was washed with cold water. This solution was then dried and the solvent was removed to give a crystalline material. This material was recrystallized from benzene to give 9 g. of N-benzoyl-N-1,2,2,2-tetrachloroethylthio urea. It melted at 158–162° C. Its infrared analysis indicated carbonyl peaks at 1660 and 1695 cm.$^{-1}$. Its element analysis for S and Cl was: S calculated 8.84%; found, 8.73%; Cl calculated 38.1%; found 37.35%.

Example 2

5 g. of N-benzoyl-N'-1,1,2,2-tetrachloroethylthio carbodiimide was dissolved in 50 ml. of acetonitrile in a vessel. About 3 ml. of water was added to this solution and the combined mixture was refluxed for 15 minutes. The reaction mixture was then cooled and filtered to give 3.7 g. of N-benzoyl-N'-1,1,2,2,-tetrachloroethylthio urea. This compound melted at 144–149° C. and had the following element analysis for Cl and S: Cl calculated 39.2%; found 38.45%; S calculated 8.84%; found 8.70%.

Example 3

9 g. formyl urea were dissolved in 100 ml. dimethylformamide in a vessel. 20 g. of 1,1,2,2-tetrachloroethylsulfenyl chloride were added to this mixture with stirring at ambient temperature. Stirring was continued for about 48 hours. About 500 ml. of water were then added with stirring to the mixture and the combined mixture was cooled. The combined mixture was extracted twice with ether and the combined extracts were washed 3 times with cold, aqueous NaCl solutions. The extracts were then dried over MgSO$_4$, filtered and the solvent was stripped off. The resulting solid residue was recrystallized from benzene to give 3 g. N-formyl-N'-1,1,2,2-tetrachloroethylthio urea. It melted at 134–136° C. and had the following element analysis for S and Cl: Cl calculated 49.6%; found 49.7%; S calculated 11.2%; found 11.2.%

In manners similar to those described in the above examples, other N-carboxyacyl-N'-hydrocarbothio ureas were prepared. These compounds and their analyses are listed in Table I.

TABLE I

| Compound | M.P., °C. | Percent S Calc. | Percent S Found | Percent Cl Calc. | Percent Cl Found |
|---|---|---|---|---|---|
| N-benzoyl-N'-p-chlorophenylthio urea | 175–177 | 10.44 | 10.34 | 11.56 | 12.40 |
| N-benzoyl-N'-1,2,2-trichloroethylthio urea | 138–142 | 9.75 | 9.58 | 32.3 | 31.45 |
| N-p-chlorobenzoyl-N'-p-chlorophenylthio urea | ¹ 200–201 | 9.41 | 9.15 | 20.9 | 20.6 |
| N-p-chlorobenzoyl-N'-1,2,2,2-tetrachloroethylthio urea | 194–196 | 8.06 | 9.02 | 44.5 | 45.0 |
| N-benzoyl-N'-trichlorovinylthio urea | 157–162 | 9.85 | 10.08 | 35.8 | 34.18 |
| N-p-chlorobenzoyl-N'-perchloromethylthio urea | 200–205 | 9.2 | 9.85 | 40.8 | 39.45 |
| N-p-chlorobenzoyl-N'-1,1,2,2-tetrachloroethylthio urea | 172–175 | 8.06 | 8.14 | 44.6 | 43.7 |
| N-p-chlorobenzoyl-N'-trichlorovinylthio urea | 163–167 | 8.90 | 8.96 | 39.4 | 38.5 |
| N-benzoyl-N'-1,2,2,2-tetrachloroethylthio urea | 158–162 | 8.84 | 8.73 | 39.1 | 37.35 |
| N-benzoyl-N'-perchloromethylthio urea | 165–168 | 10.22 | 9.91 | 34.0 | 32.95 |
| N-p-nitrobenzoyl-N'-p-chlorophenylthio urea | 200–204 | 9.1 | 8.83 | 10.1 | 10.03 |
| N-p-nitrobenzoyl-N'-1,1,2,2-tetrachloroethylthio urea | 166–171 | 7.86 | 8.04 | 34.9 | 34.35 |
| N-p-nitrobenzoyl-N'-perchloromethylthio urea | ¹ 180–184 | 8.92 | 8.79 | 29.55 | 29.09 |
| N-acetyl-N'-1,1,2,2-tetrachloroethylthio urea | | 10.66 | 10.38 | 47.4 | 44.35 |

¹ Dec.

Ureas of this invention have exhibited fungicidal activity. Particular organisms which ureas of this invention controlled were Pythium, Helminthosporium, Rhizocotonia, Monilinia and Alternaria. In using these ureas as fungicides it is expected that they will be formulated in fungicidal quantities with appropriate solid or liquid diluents or carriers. Likewise it is anticipated they may be applied in fungicidal amounts to fungi or hosts, particularly vegetative hosts such as plants, paper, etc., which are subject to attack from fungi. Established means and methods may be used for such application. Fungicidal formulations of these ureas may also contain stickers, plant growth regulators, fillers, stabilizers, other compatible pesticides and the like.

I claim:

1. Compound of the formula

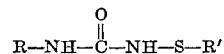

in which R represents formyl, alkanoyl of 2 to 15 carbon atoms which except for the oxygen of the carbonyl is hydrocarbyl, aroyl of 7 to 15 carbon atoms which except for the oxygen of the carbonyl is hydrocarbyl, monohalobenzoyl in which the halogen is chlorine or bromine or mononitrobenzoyl and R' represents a polychloroalkyl group of 1 to 2 carbon atoms and 3 to 5 chlorine atoms, at least 1 of which is bonded to the α carbon atom of the alkyl, a polychlorovinyl group having 2 to 3 chlorine atoms or a chlorophenyl group having 1 to 5 chlorine atoms.

2. The compound of claim 1 in which R' is trichloromethyl or 1,1,2,2-tetrachloroethyl.

3. The compound of claim 1 in which R is alkanoyl of 2 to 4 carbon atoms, benzoyl, p-chlorobenzoyl or p-nitrobenzoyl.

4. The compound of claim 1 in which R is benzoyl and R' is 1,1,2,2-tetrachloroethyl.

5. The compound of claim 1 in which R is p-chlorobenzoyl and R' is 1,1,2,2-tetrachloroethyl.

6. The compound of claim 1 in which R is p-nitrobenzoyl and R' is 1,1,2,2-tetrachloroethyl.

7. The compound of claim 1 in which R is benzoyl and R' is trichlorovinyl.

(References on following page)

References Cited

UNITED STATES PATENTS

| | | | |
|---|---|---|---|
| 3,166,587 | 1/1965 | Bernstein et al. | 260—453 X |
| 3,344,153 | 9/1967 | Kühle et al. | 260—453 X |

FOREIGN PATENTS

| | | |
|---|---|---|
| 249,096 | 4/1963 | Australia. |
| 192,797 | 4/1967 | U.S.S.R. |

CHARLES B. PARKER, Primary Examiner

S. T. LAWRENCE III, Assistant Examiner

U.S. Cl. X.R.

71—3; 260—402.5, 464, 465, 465.4, 558, 559, 561, 562; 424—298, 304